(12) United States Patent
Kim

(10) Patent No.: US 11,822,890 B2
(45) Date of Patent: *Nov. 21, 2023

(54) METHOD, SYSTEM, AND COMPUTER PROGRAM FOR ARTIFICIAL INTELLIGENCE ANSWER

(71) Applicant: 42 Maru Inc., Seoul (KR)

(72) Inventor: Dong Hwan Kim, Seoul (KR)

(73) Assignee: 42 Maru Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,493

(22) Filed: Jun. 6, 2022

(65) Prior Publication Data
US 2022/0300715 A1 Sep. 22, 2022

Related U.S. Application Data

(63) Continuation of application No. 17/039,273, filed on Sep. 30, 2020, now Pat. No. 11,373,047, which is a (Continued)

(30) Foreign Application Priority Data

Sep. 19, 2018 (KR) .......................... 10-2018-0112488

(51) Int. Cl.
| | |
|---|---|
| G06F 40/30 | (2020.01) |
| G06N 20/00 | (2019.01) |
| G06N 5/02 | (2023.01) |

(52) U.S. Cl.
CPC ............... *G06F 40/30* (2020.01); *G06N 5/02* (2013.01); *G06N 20/00* (2019.01)

(58) Field of Classification Search
CPC .................................................... G06N 20/00
See application file for complete search history.

(56) References Cited

U.S. PATENT DOCUMENTS 10,546,001 B1 * 1/2020 Nguyen ................. G06F 40/186
11,373,047 B2 * 6/2022 Kim .......................... G06N 5/04
(Continued)

FOREIGN PATENT DOCUMENTS

EP           3540611 A1    9/2019
KR   10-2015-0014236 A    2/2015
(Continued)

OTHER PUBLICATIONS

EPO; Application No. 18207992.1; Extended European Search Report dated Aug. 14, 2019.
(Continued)

*Primary Examiner* — Douglas Godbold
(74) *Attorney, Agent, or Firm* — Fitch, Even, Tabin & Flannery LLP

(57) ABSTRACT

Provided is an artificial intelligence (AI) answering system including a user question receiver configured to receive a user question from a user terminal; a first question extender configured to generate a question template by analyzing the user question and determine whether the user question and the generated question template match; a second question extender configured to generate a similar question template by using a natural language processing and a deep learning model when the user question and the generated question template do not match; a training data builder configured to generate training data for training the second question extender by using an neural machine translation (NMT) engine; and a question answering unit configured to transmit a user question result derived through the first question extender or the second question extender to the user terminal.

10 Claims, 9 Drawing Sheets

Related U.S. Application Data continuation of application No. 16/184,728, filed on Nov. 8, 2018, now Pat. No. 10,832,004.

(56) References Cited

U.S. PATENT DOCUMENTS

| | | | | |
|---|---|---|---|---|
| 2010/0332500 | A1* | 12/2010 | Pan | G06F 16/951 |
| | | | | 707/769 |
| 2011/0314003 | A1* | 12/2011 | Ju | G10L 15/1822 |
| | | | | 707/723 |
| 2012/0259801 | A1* | 10/2012 | Ji | G06N 20/00 |
| | | | | 706/12 |
| 2013/0254155 | A1* | 9/2013 | Thollot | G06F 16/283 |
| | | | | 707/602 |
| 2014/0122388 | A1* | 5/2014 | Bai | G06N 20/00 |
| | | | | 706/12 |
| 2014/0222743 | A1* | 8/2014 | Baughman | G06N 5/02 |
| | | | | 706/46 |
| 2015/0234888 | A1* | 8/2015 | Ahmed | G06F 16/2425 |
| | | | | 707/765 |
| 2015/0278902 | A1* | 10/2015 | Warren | G06F 16/144 |
| | | | | 705/26.61 |
| 2015/0339590 | A1* | 11/2015 | Maarek | G06N 20/00 |
| | | | | 707/754 |
| 2015/0371137 | A1 | 12/2015 | Giffels et al. | |
| 2016/0180242 | A1* | 6/2016 | Byron | G06N 5/041 |
| | | | | 706/11 |
| 2017/0046625 | A1* | 2/2017 | Takaai | G06F 16/3329 |
| 2017/0109434 | A1* | 4/2017 | Boxwell | G06N 20/00 |
| 2017/0206154 | A1* | 7/2017 | Kochura | G06N 5/04 |
| 2018/0075016 | A1* | 3/2018 | Bennett | G06N 5/01 |
| 2018/0260472 | A1* | 9/2018 | Kelsey | G06F 40/56 |
| 2018/0329883 | A1* | 11/2018 | Leidner | G06F 40/30 |
| 2018/0336792 | A1* | 11/2018 | Cha | G06N 7/01 |
| 2018/0341871 | A1* | 11/2018 | Maitra | G06N 3/042 |
| 2019/0042663 | A1* | 2/2019 | Gupta | G06F 40/35 |
| 2019/0164064 | A1* | 5/2019 | Li | G10L 15/1822 |
| 2019/0171728 | A1* | 6/2019 | Wakankar | G06F 16/90324 |
| 2019/0205726 | A1* | 7/2019 | Khabiri | G06F 16/243 |
| 2019/0377796 | A1* | 12/2019 | Datla | G06F 40/30 |

FOREIGN PATENT DOCUMENTS

| | | |
|---|---|---|
| KR | 10-1678787 B1 | 12/2016 |
| KR | 10-2017-0101609 A | 9/2017 |
| KR | 10-1851787 B1 | 4/2018 |
| KR | 10-2018-0060903 A | 6/2018 |

OTHER PUBLICATIONS

KPO; Application No. 10-2018-0112488; Office Action dated Aug. 12, 2019.

Mallinson, Jonathan, Rico Sennrich, and Mirella Lapata. "Paraphrasing Revisited with Neural Machine Translation." Proceedings of the 15th Conference of the European Chapter of the Association for Computational Linguistics: vol. 1, Long Papers. (Year: 2017).

* cited by examiner

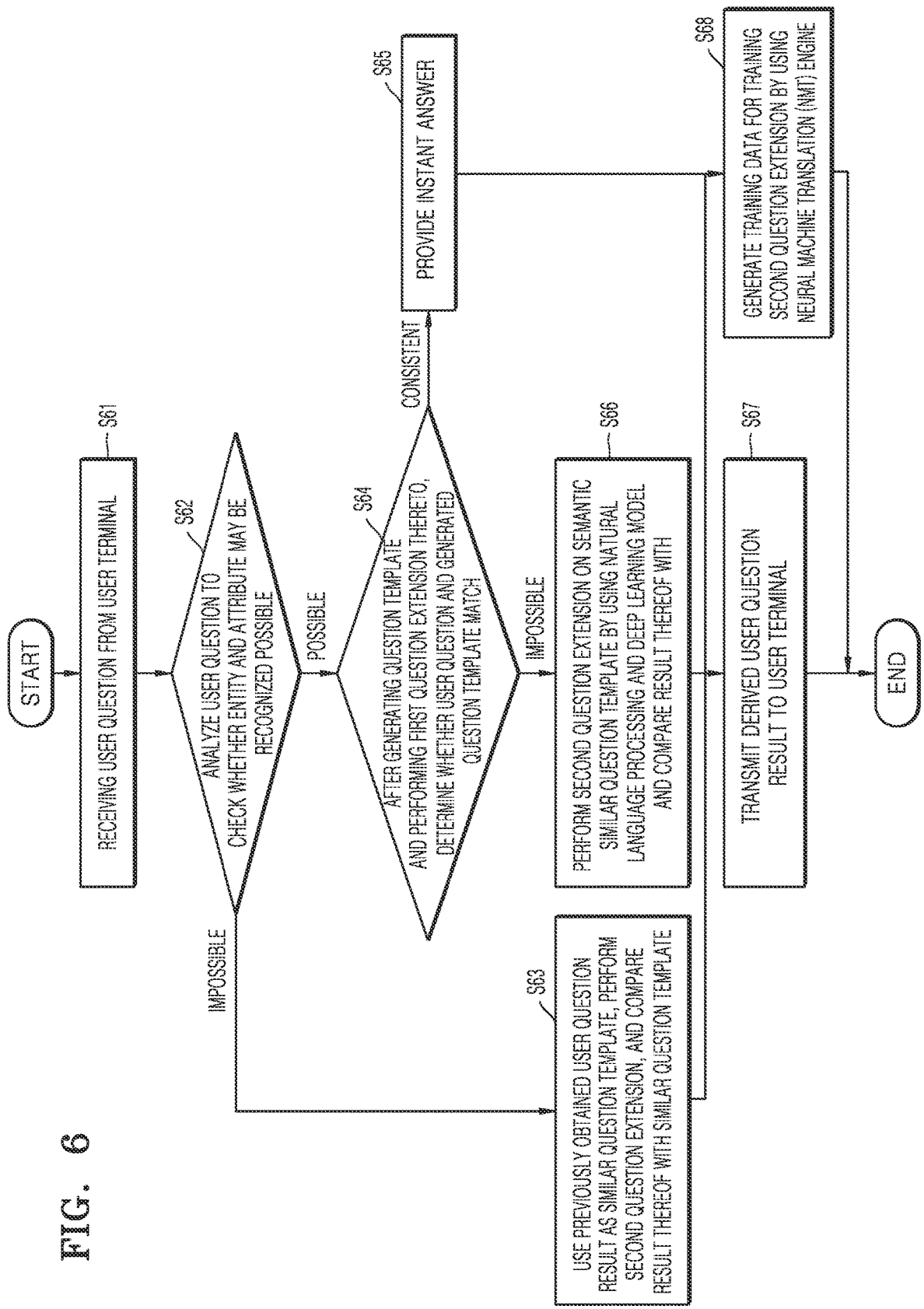

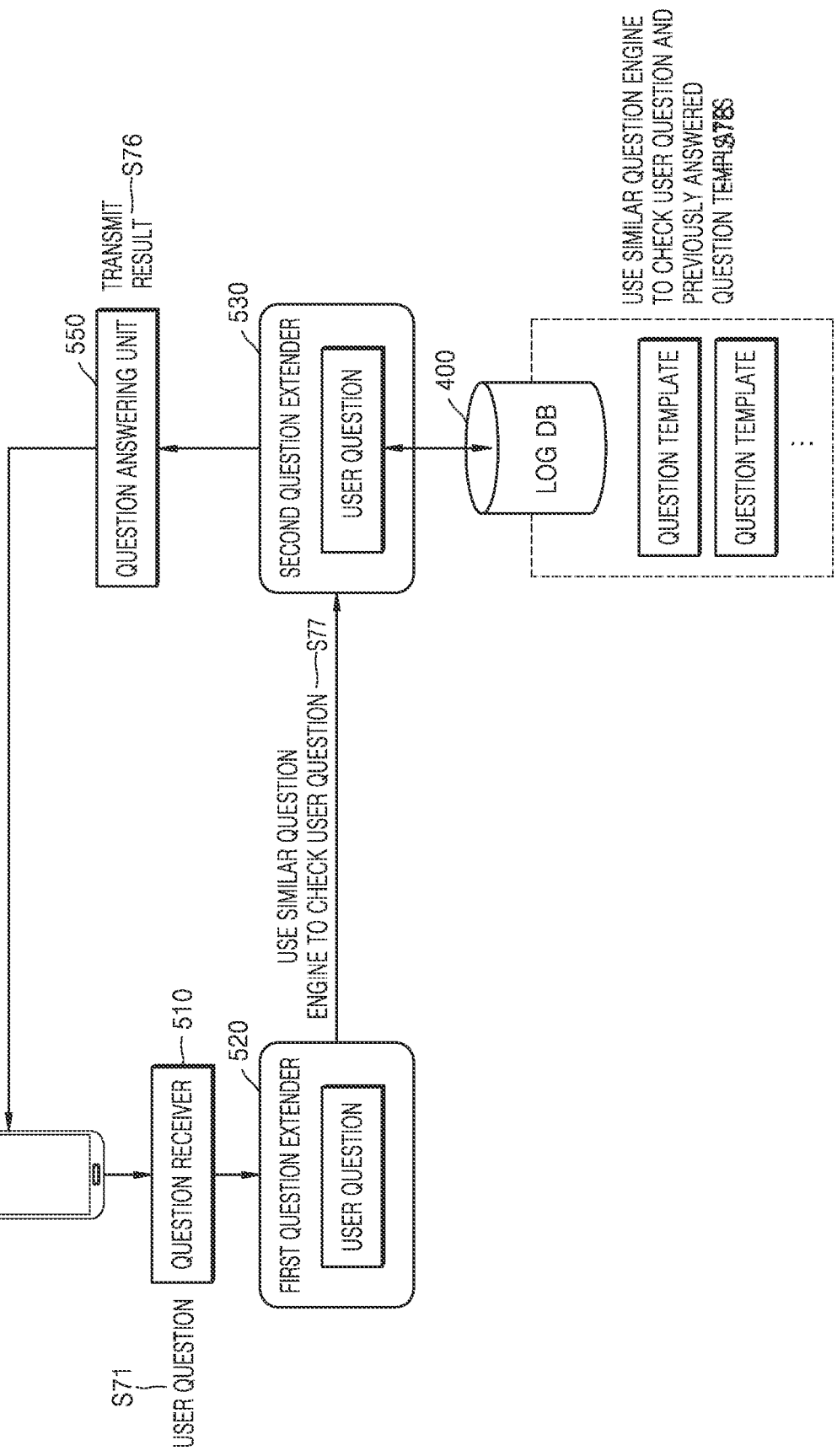

METHOD, SYSTEM, AND COMPUTER PROGRAM FOR ARTIFICIAL INTELLIGENCE ANSWER

CROSS-REFERENCE TO RELATED APPLICATIONS

This application is a continuation of U.S. patent application Ser. No. 17/039,273, filed Sep. 30, 2020, which is a continuation of U.S. patent application Ser. No. 16/184,728, filed Nov. 8, 2018, and claims priority to the prior Korean Patent Application No. 10-2018-0112488, filed on Sep. 19, 2018, in the Korean Intellectual Property Office, the disclosures of which are incorporated herein in their entirety by reference.

BACKGROUND

1. Field

One or more embodiments relate to a system, a method, and a computer program for artificial intelligence answer, and more particularly, to a system, a method, and a computer program for artificial intelligence answer by building training data using a neural machine translation (NMT) engine and learning a paraphrasing engine to accurately understand natural language-based sentences and provide intended search results.

2. Description of the Related Art

In order to implement various application services handling data expressed in natural language, it is necessary to understand and engineer linguistic knowledge, structural knowledge of each language, and complex qualities of each language. Therefore, there are difficulties for adding a new language or a new domain.

In particular, the traditional natural language understanding (NLU) scheme is strongly dependent on hand-crafted features. Therefore, it takes a lot of time to extract features, and it may not be possible to cope with various cases including new patterns, typos, spelling errors, and the like.

To solve this problem, a deep learning-based NLU processing scheme based has recently been proposed. The deep learning-based NLU scheme is a scheme that automatically learns features from data, thus being capable of processing a wider range of context information than before. Therefore, the deep learning-based NLU scheme is more robust for new words that have not yet been learned or typos as compared to traditional rule/statistics-based NLU schemes, and thus disadvantages of the traditional NLU schemes may be resolved to a certain extent.

On the other hand, along with the development of artificial intelligence (AI) technology including popularization of smart machines like speech-recognition loudspeakers, the traditional information retrieval scheme that receives keyword inputs and provides lists of documents is being shifted to an information retrieval scheme that receives natural language-based sentence inputs and provides specific answers.

PRIOR ART DOCUMENT

Patent Literature

KR 10-1851787 B1

SUMMARY

One or more embodiments include precise understanding of natural language-based sentences and providing of intended search results.

One or more embodiments include construction of training data using a neural machine translation (NMT) engine and training of a paraphrasing engine to improve accuracy of information retrieval.

Additional aspects will be set forth in part in the description which follows and, in part, will be apparent from the description, or may be learned by practice of the presented embodiments.

According to one or more embodiments, an artificial intelligence (AI) answering system includes a user question receiver configured to receive a user question from a user terminal; a first question extender configured to generate a question template by analyzing the user question and determine whether the user question and the generated question template match; a second question extender configured to generate a similar question template by using a natural language processing and a deep learning model when the user question and the generated question template do not match; a training data builder configured to generate training data for training the second question extender by using an neural machine translation (NMT) engine; and a question answering unit configured to transmit a user question result derived through the first question extender or the second question extender to the user terminal.

According to one or more embodiments, the question template and the similar question template may be semantic triple-based question templates each including an entity, an attribute, and an instant answer.

According to one or more embodiments, the training data builder, by using the NMT engine, may translate a first sentence in Korean into a particular foreign language, obtain a second sentence by translating the first sentence translated into the particular foreign language back into Korean, and use the generated second sentence to build training data.

According to one or more embodiments, the second question extender may include a natural language expanding module configured to natural language-process on the user question; and a paraphrasing engine configured to generate a similar question template by paraphrasing the natural language-processed user question.

According to one or more embodiments, when the user question does not match the generated question template, an instant answer corresponding to the generated question template may be provided to the user terminal.

According to one or more embodiments, an artificial intelligence (AI) answering method includes receiving a user question from a user terminal; a first question extension operation for generating a question template by analyzing the user question and determine whether the user question and the generated question template match; a second question extension operation for generating a similar question template by using a natural language processing and a deep learning model when the user question and the generated question template do not match; a training data building operation for generating training data for training the second question extender by using an neural machine translation (NMT) engine; and a question answering operation for transmitting a user question result derived through the first question extension operation or the second question extension operation to the user terminal.

According to one or more embodiments, the question template and the similar question template may be semantic triple-based question templates each including an entity, an attribute, and an instant answer.

According to one or more embodiments, in the training data building operation, by using the NMT engine, a first sentence in Korean may be translated into a particular foreign language, a second sentence may be obtained by translating the first sentence translated into the particular foreign language back into Korean, and the generated second sentence may be used to build training data.

According to one or more embodiments, in the training data building operation, by using the NMT engine, a first sentence in Korean may be translated into a particular foreign language, a second sentence may be obtained by translating the first sentence translated into the particular foreign language back into Korean, and the generated second sentence may be used to build training data.

According to one or more embodiments, when the user question does not match the generated question template, an instant answer corresponding to the generated question template may be provided to the user terminal.

BRIEF DESCRIPTION OF THE DRAWINGS

These and/or other aspects will become apparent and more readily appreciated from the following description of the embodiments, taken in conjunction with the accompanying drawings in which:

FIG. 6 is a time-series diagram showing an AI answering method according to one or more embodiments;

FIGS. 7A and 7B are diagrams illustrating the overall structure of an AI answering system according to one or more embodiments.

DETAILED DESCRIPTION

Figure 1:
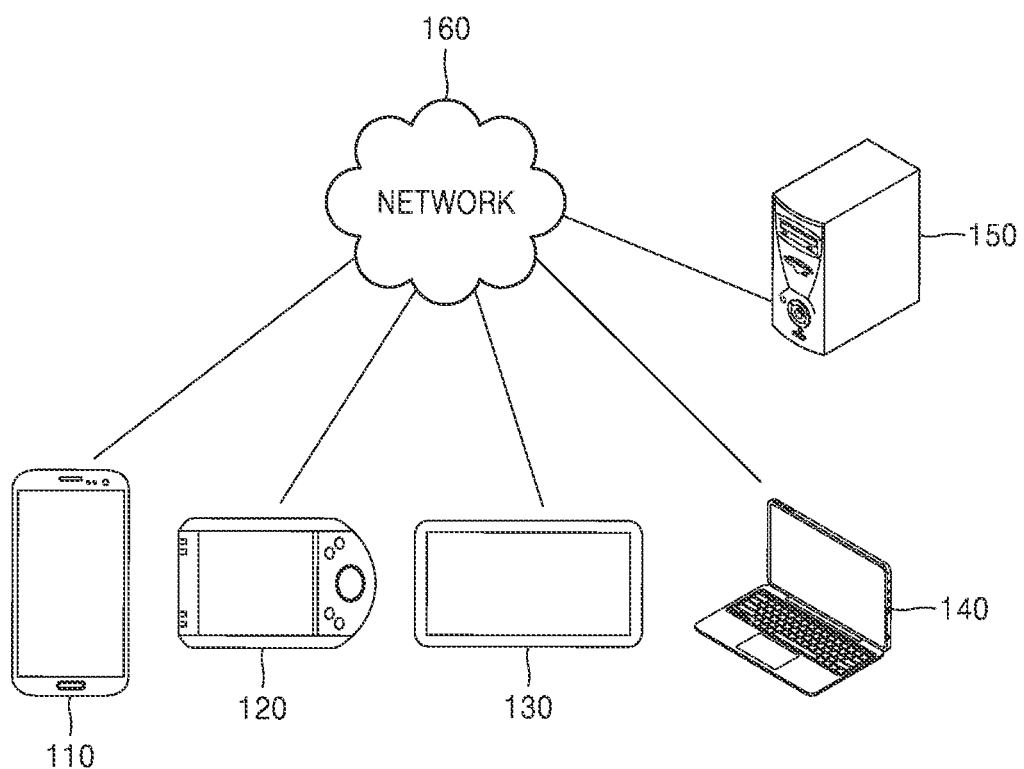
FIG. 1 is a diagram showing an example of a network environment according to one or more embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The detailed descriptions of one or more embodiments below refers to the accompanying drawings, which illustrate, by way of example, specific embodiments in which one or more embodiments may be practiced. These embodiments are described in sufficient detail to enable one of ordinary skill in the art to practice one or more embodiments. It should be understood that one or more embodiments are different, but need not be mutually exclusive. For example, certain features, structures, and characteristics described herein may be implemented and changed without departing from the spirit and scope of the invention, from one embodiment to another. It should also be understood that the position or arrangement of individual components within each embodiment may be varied without departing from the spirit and scope of one or more embodiments. Accordingly, the detailed descriptions below are not to be taken in a limiting sense, and the scope of one or more embodiments should be construed as encompassing the scope of the appended claims and all such equivalents. In the drawings, like reference numerals refer to the same or similar components in several aspects.

FIG. 1 is a diagram showing an example of a network environment according to one or more embodiments.

FIG. 1 shows an example in which a network environment includes a plurality of user terminals 110, 120, 130, and 140, a server 150, and a network 160. However, the number of user terminals and the number of servers are merely examples and are not limited to those shown in FIG. 1.

The plurality of user terminals 110, 120, 130, 140 may be stationary terminals or mobile terminals implemented as computer devices. Examples of the plurality of user terminals 110, 120, 130, and 140 include smart phones, mobile phones, navigation devices, computers, laptop computers, digital broadcasting terminals, personal digital assistants (PDA), portable multimedia players (PMP), tablet PCs, etc. For example, a first user terminal 110 may communicate with the other user terminals 120, 130, and 140 and/or the server 150 via the network 160 using a wireless or wire communication scheme.

The communication scheme is not limited and may include not only communication schemes using communication networks (e.g., a mobile communication network, a wired Internet, a wireless Internet, a broadcasting network, etc.) that the network 160 may include, but also a short-range wireless communication between devices. For example, the network 160 may include any one or more of networks including a personal area network (LAN), a local area network (LAN), a campus area network (CAN), a metropolitan area network (MAN), a wide area network (WAN), a broadband network (BBN), the Internet, etc. The network 160 may also include, but is not limited to, any one or more of network topologies including a bus network, a star network, a ring network, a mesh network, a star-bus network, a tree or hierarchical network, etc.

The server 150 may include a computer device or a plurality of computer devices that communicate with the plurality of user terminals 110, 120, 130, and 140 through the network 160 and provide commands, codes, files, contents, and services.

For example, the server 150 may provide a file for installation of an application to the first user terminal 110 connected through the network 160. In this case, the first user terminal 110 may install the application by using the file provided from the server 150. Also, the first user terminal 110 may access the server 150 under the control of an operating system (OS) and at least one program (e.g., a browser or an installed application) included in the first user terminal 110 and receive contents or services provided by the server 150. For example, when the user terminal 110 transmits an user question to the server 150 through the network 160 under the control of an application, the server 150 may transmit a unique instant response by using a semantic triple-based knowledge extension system to the first user terminal 110, and the first user terminal 110 may display the unique instant response under the control of the application. In another example, the server 150 may establish a communication session for data transmission and reception and may route data transmissions and receptions between the plurality of user terminals 110, 120, 130, and 140 through the established communication session.

Figure 2:
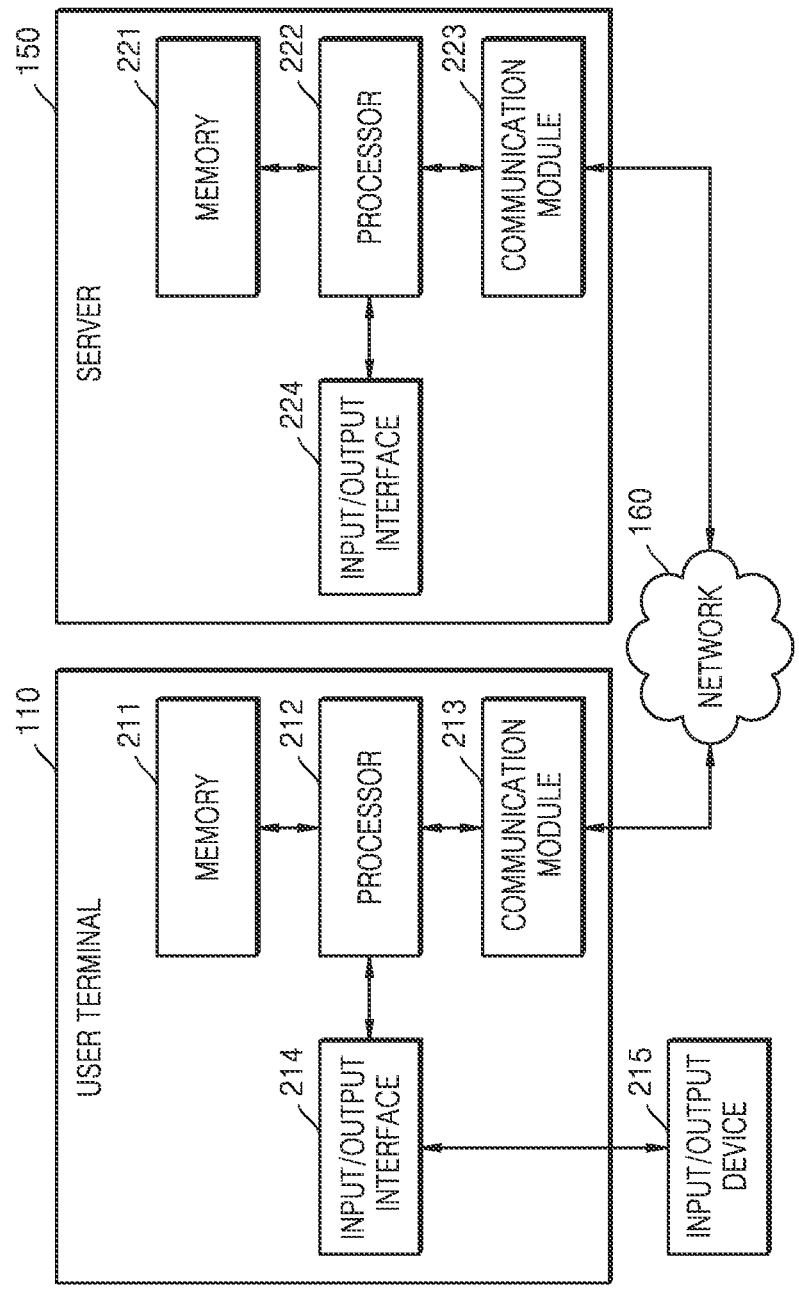
FIG. 2 is a block diagram for describing internal configurations of a user terminal and a server according to one or more embodiments.

FIG. 2 is a block diagram for describing internal configurations of a user terminal and a server according to one or more embodiments.

Referring to FIG. 2, the internal configuration of the first user terminal 110 will be described as an example of a user terminal, and the server 150 will be described as an example of a server. The other user terminals 120, 130, and 140 may also have the same or similar internal configuration.

The first user terminal 110 and the server 150 may include memories 211 and 221, processors 212 and 222, communication modules 213 and 223, and input/output interfaces 214 and 224, respectively. The memory 211 and 221 are computer-readable recording media and may include permanent mass storage devices like random access memories (RAM), read-only memories (ROM), and disk drives. Also, the memory 211 and 221 may each store an OS and at least one program code (e.g., a browser installed and executed on the first user terminal 110 or a code for the above-mentioned application). These software components may be loaded from a computer readable recording medium separate from the memory 211 and 221 by using a drive mechanism. Such a separate computer readable recording medium may include a computer readable recording medium like a floppy drive, a floppy disk, a tape, a DVD, a CD-ROM, a memory card, and the like. According to another embodiment, the software components may be loaded into the memories 211 and 221 via the communication modules 213 and 223 rather than computer-readable recording media. For example, at least one program may be loaded into the memories 211 and 221 by developers or a program (e.g., the above-mentioned program) that is installed by files provided by a file distribution system (e.g., the server 150 described above), which distributes installation files for applications, via the network 160.

The processors 212 and 222 may be configured to process instructions of a computer program by performing basic arithmetic, logic, and input/output operations. An instruction may be provided to the processors 212 and 222 by the memories 211 and 221 or the communication modules 213 and 223. For example, the processors 212 and 222 may be configured to execute received commands in accordance with program codes stored in storage devices like the memories 211 and 221.

The communication modules 213 and 223 may provide a function for the first user terminal 110 and the server 150 to communicate with each other via the network 160 and may provided functions to communicate with another user terminal (e.g., a second user terminal 120) or another server (e.g., server 150). For example, a request generated by a processor 212 of the first user terminal 110 according to a program code stored in a storage device like a memory 211 may be transmitted to the server 159 via the network 160 under the control of a communication module 213. Conversely, control signals, commands, contents, files, and the like provided under the control of a processor 222 of the server 150 may be transmitted through a communication module 223 and the network 160 and received by the first user terminal 110 via the communication module 213 of the first user terminal 110. For example, control signals or commands of the server 150 received through the communication module 213 may be transmitted to the processor 212 or the memory 211, and contents or files may be transmitted to a storage medium that the first user terminal 110 may further include.

The input/output interfaces 214 and 224 may be units for interfacing with the input/output device 215. For example, an input device may include a device like a keyboard or a mouse, and an output device may include a device like a display for displaying a communication session of an application. In another example, the input/output interface 214 may be a unit for interfacing with a device having integrated functions for input and output, e.g., a touch screen. in detail, when the processor 212 of the first user terminal 110 processes a command of a computer program loaded to the memory 211, a service screen or content generated by using data provided by the server 150 or the second user terminal 120 may be displayed on a display via the input/output interface 214.

Also, in other embodiments, the first user terminal 110 and the server 150 may include more components than the components shown in FIG. 2. However, there is no need to clearly illustrate most of components in the related art. For example, the first user terminal 110 may be implemented to include at least some of the examples of the input/output device 215 described above or may further include other components like a transceiver, a global positioning system (GPS) module, a camera, various sensors, database, etc.

An AI answering method and an AI answering system according to one or more embodiments may be implemented by the server 150. More particularly, the AI answering method may be implemented by commands processed by the processor 222 of the server 150.

One or more embodiments provide an AI answering method, an AI answering device, and an AI answering, thereby establishing a system capable of answering various questions of users.

Due to the rise of AI-based smart machines like AI speakers, question answering (QA) search, which is different from portal search in the related art, has appeared. As means for retrieving and inputting information are shifting from touches and keyword inputs to voice, the need to understand natural language-based sentences has increased, unlike keyword-based searches in previous portal searches.

Therefore, to correctly understand a natural language-based sentence and deliver an intended search result, an AI-based answering method, an AI-based answering device, and an AI-based answering program that may cope with various cases including new patterns, typos, and spelling errors are needed.

One or more embodiments may be applied to all systems for determining users' intentions and providing desired results other than the above-described QA search, and thus one or more embodiments may be applied in various forms. For example, in case of utilizing a slot filling scheme instead of an instant answer provided as a correct answer in a knowledge QA, one or more embodiments may be applied to provide needed information via an API that provides particular functions according to users' intentions. Accordingly, one or more embodiments may be applied to a wide range of applications including home IOT, smart toys/home robots, connected cars, etc. Therefore, although the descriptions below will focus on a QA search method, one or more embodiments is not necessarily limited thereto and may be applied to all applicable systems.

Before describing one or more embodiments in detail, a difference between an AI answering method according to one or more embodiments and an existing search engine will be described. An AI answering system according to one or more embodiments may provide a unique instant answer by using a semantic triple-based question template. The AI answering method according to one or more embodiments may be different from existing search engines in that it provides a search result in the form of a unique instant answer (instant answer) rather than a document. In addition, the AI answering method of the present invention may construct training data for providing a a semantic triple-based search result.

Figure 3:
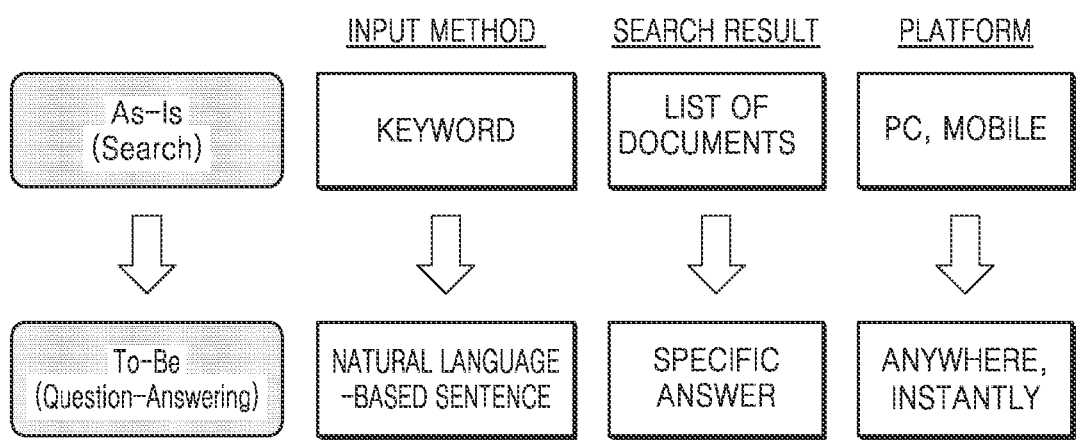
FIG. 3 is a diagram for describing a semantic triple-based search result.

FIG. 3 is a diagram for describing a semantic triple-based search result.

Referring to FIG. 3, a previous search engine As-Is (Search) receives a keyword as an input and provides a list of documents as a search result, wherein a search platform thereof operates on a PC or a mobile device.

On the other hand, the AI answering method To-Be (Question-Answering) according to one or more embodiments receives an input in the form of the natural language, may provide a specific answer, that is, an instant unique answer, and may be implemented anywhere, not just on a PC or a mobile device.

More particularly, the AI answering method according to one or more embodiments allows input of a natural language-based sentence while an existing search engine receives input of keywords, and thus a user may naturally search for information like the user is asking a question to a person. Furthermore, the AI answering method according to one or more embodiments may provide a specific answer as a search result, thereby reducing the inconvenience that a user needs to find a search result in a list of documents provided by an existing search engine and providing an optimal search result. Furthermore, the AI answering method according to one or more embodiments enables instant search for information anywhere on a smart machine basis, not limited to a PC or a mobile platform.

Figure 4:
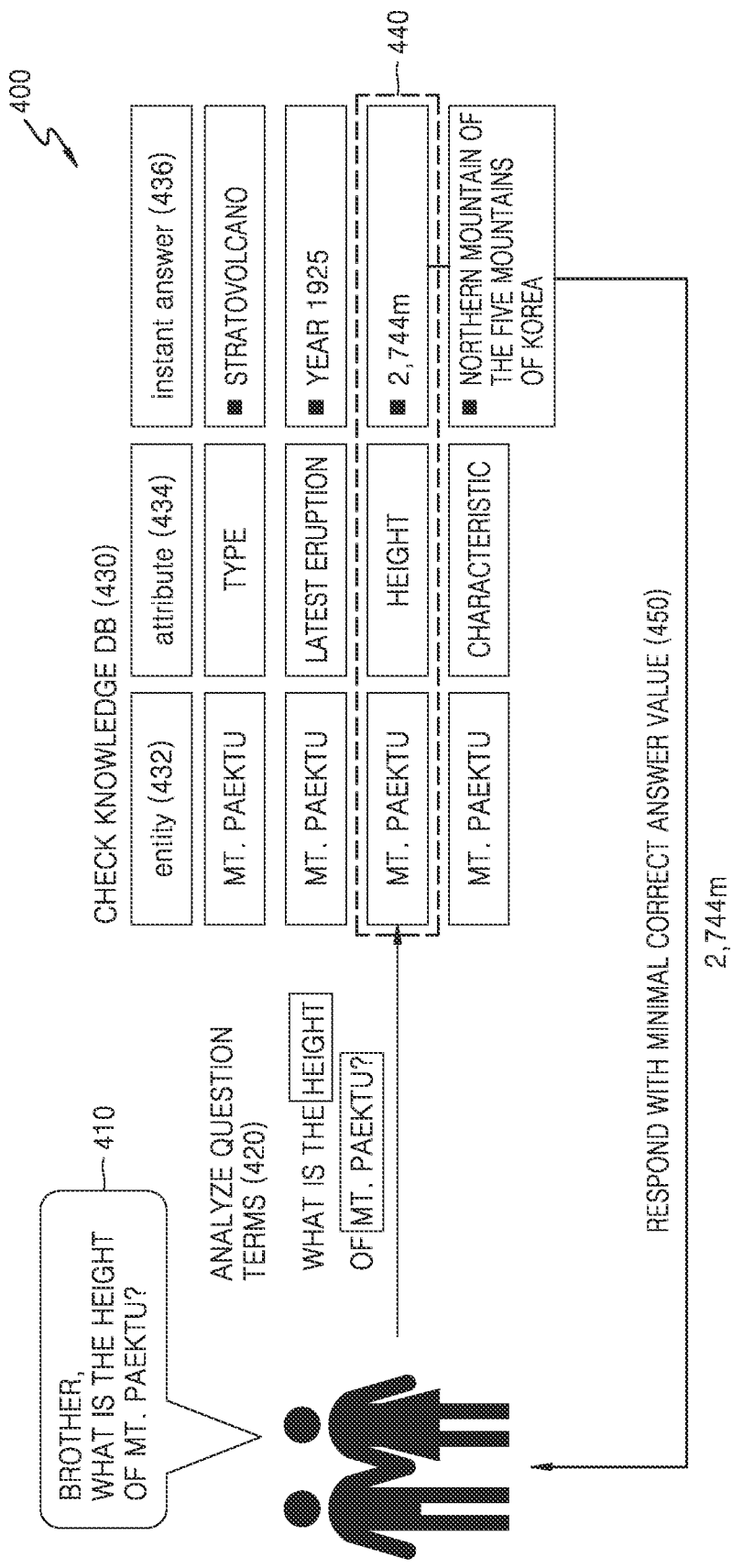
FIG. 4 is a diagram showing an example of a semantic triple-based search.

FIG. 4 is a diagram showing an example of a semantic triple-based search.

A knowledge DB 400 shown in FIG. 4 is a special knowledge base database in which data is stored in a semantic triple form simulating questions of actual users, where a unique instant answer may be searched for without a separate reasoning process The knowledge DB 400 has the form of entity 432-attribute 434-instant answer 438. In the embodiment described below, the knowledge DB 400 may be a database existing inside or outside the server 150 and may communicate with the processor 222 to provide data.

In FIG. 4, when a user question "what is the height of Mt. Paektu?" 410 is received, the user question 410 is analyzed (420) to extract keywords 'Mt. Paektu' and 'height', and the 'Mt. Paektu' may be analyzed as the subject of the user question 410 and the height may be analyzed as the intention of the user question 410. In this case, data having an entity="Mt. Paektu" and attribute="height" is searched for and an instant answer of the corresponding item is determined as a result value, thereby providing a corresponding answer 2,744 m to the user (450). The knowledge DB 400 as described above may provide an optimal answer without a separate reasoning process to search for a best correct answer. Hereinafter, the AI answering system and the AI answering method based on the semantic triples according to one or more embodiments as described in FIGS. 3 and 4 will be described in more detail.

Figure 5:
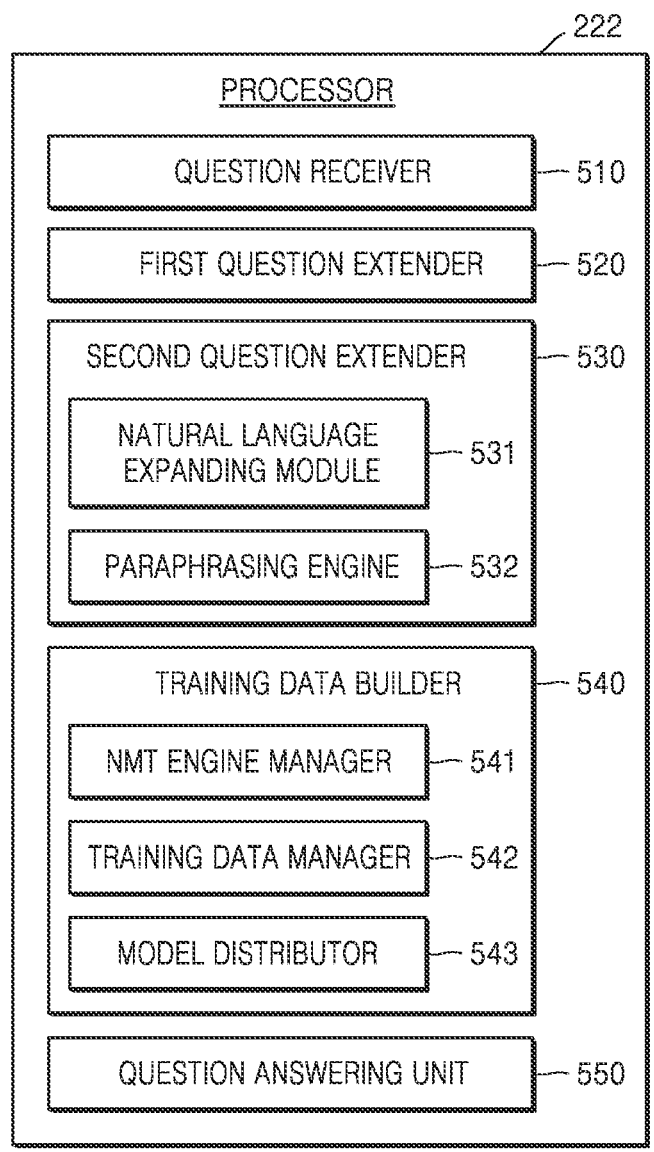
FIG. 5 is a diagram showing the internal structure of a processor according to one or more embodiments.

FIG. 5 is a diagram showing an internal structure of a processor according to one or more embodiments.

The processor 212 may include a web browser or an application capable of receiving and outputting a web page from online. As shown in FIG. 3, the configuration of a semantic triple-based knowledge extension system according to one or more embodiments may include a question receiver 510, a first question extender 520, a second question extender 530, a training data builder 540, and a question answering unit 550. In addition, the second question extender 530 may include a natural language extension module 531 and a paraphrasing engine 532. The training data builder 540 may include an NMT engine manager 541, a training data manager 542, and a model distributor 543. The components of the processor 212 may optionally be included in or excluded from the processor 212 according to one or more embodiments. In addition, according to embodiments, the components of the processor 212 may be separated or merged for implementation of the function of the processor 212.

Here, the components of the processor 212 may be implementation of different functions of the processor 212 that are performed by the processor 212 according to instructions provided by program codes stored in the first user terminal 110 (e.g., instructions provided by a web browser executed on the first user terminal 110).

The processor 212 and the components of the processor 212 may control the first user terminal 110 to perform operations S1 to S5 included in the AI answering method of FIG. 4. For example, the processor 212 and the components of the processor 212 may be implemented to execute instructions according to codes of an operating system and at least one program included in the memory 211.

Figure 7A:
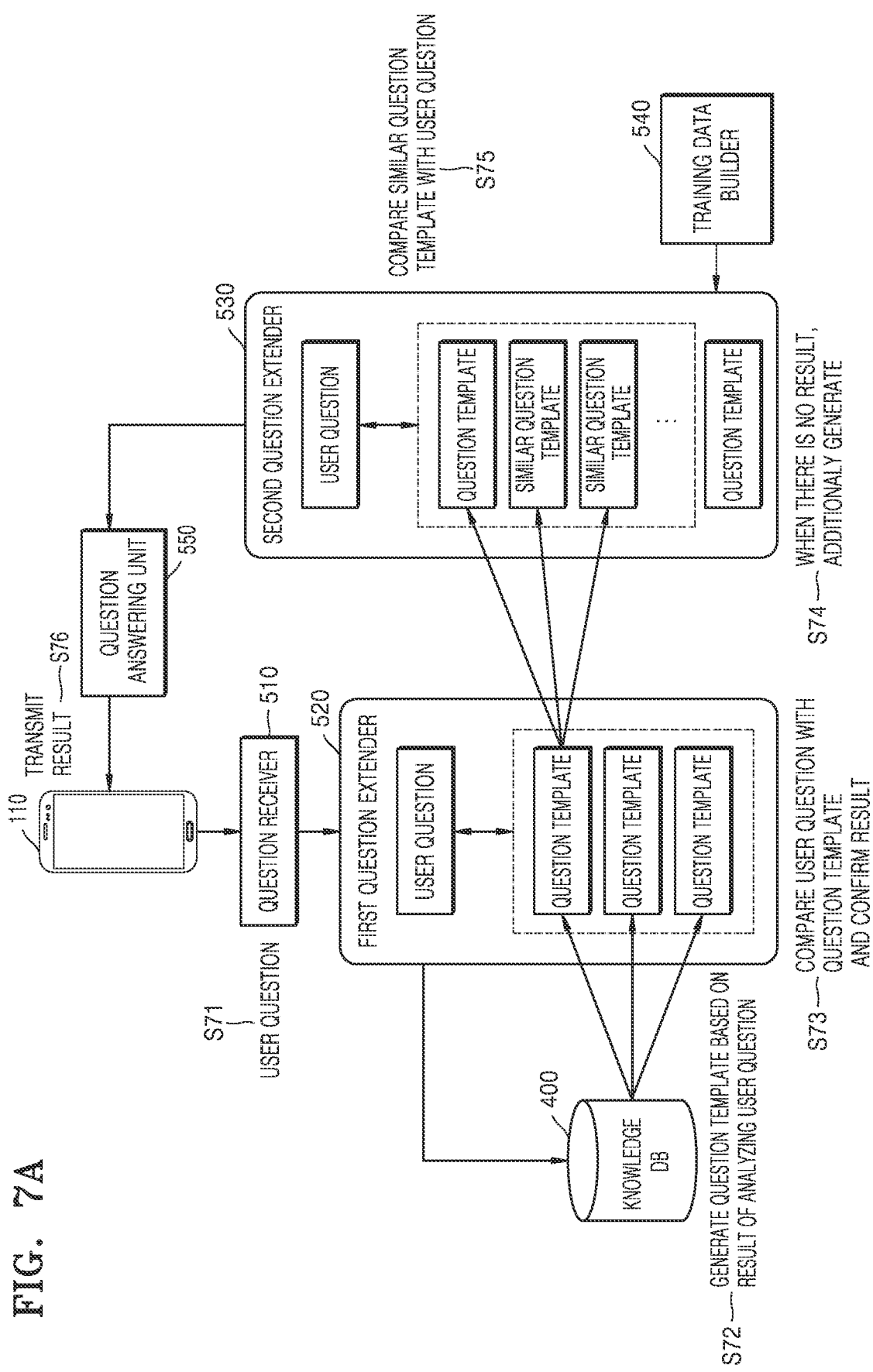

FIG. 6 is a time-series diagram showing an AI answering method according to one or more embodiments, and FIGS. 7A and 7B are diagrams illustrating the overall structure of an AI answering system according to one or more embodiments. In detail, FIG. 7A shows an operation of the AI answering system when a user question analysis is successful, and FIG. 7B shows an operation of the AI answering system when a user question analysis is not successful. Hereinafter, one or more embodiments will be described with reference to FIGS. 6, 7A, and 7B.

First, the question receiver 510 receives a user question from a user terminal 110 (operation S61). In detail, the question receiver 510 receives a user question (operation S71) and transmits the received user question to the first question extender 520 (operation S72). The user question may be received in various forms, e.g., voice, text, etc. The question receiver 510 may convert the user question into an appropriate form through an appropriate conversion process.

According to one or more embodiments, a user may input a natural language-based question to the user terminal 110, which is an AI-based smart machine to which the AI answering method, the AI answering device, and the AI answering program according to one or more embodiments are applied. The smart machine may include not only existing smartphones and computers, but also AI speakers, connected cars, home IoT, AI appliances, personal assistants, home robots/smart toys, chatbot applications, and intranets.

Next, the first question extender 520 analyzes the user question to check whether a entity and an attribute are recognizable (operation S62). When the entity and attribute are recognized as a result of the analysis of the user question, a question template is generated to perform a first question extension, and it is checked whether the user question and the generated question template match (operation S64). In more detail, the first question extender 520 performs a primary search by analyzing the user question, checking answer information about the user question from the knowledge DB 400, finding the answer information in the knowledge DB 400, generating a plurality of question templates similar to the corresponding user question, and determining whether the user question and the question templates match through comparison.

In detail, the first question extender 520 may generate a question template that conforms to the user question based on a result of the analysis of the user question. When a user question is received, the first question extender 520 analyzes the user question, generates a question template based on a result of the analysis, and performs a first question extension. At this time, the first question extender 520 may generate a question template from a knowledge DB 400 as described above. Hereinafter, a detailed configuration that the first question extender 520 generates a question template will be described.

First, the first question extender 520 may analyze a user question using the a natural language processing (NLP) engine to analyze the user question in the semantic triple format as described above. At this time, an entity and an attribute are retrieved from the user question by using a technique like a morphological analysis. Since an ordinary user asks a question in the form of entity+attribute, a sentence is sequentially analyzed to retrieve a group of candidates of the entity and the attribute from the user question.

According to one or more embodiments, when only one entity and one attribute are retrieved based on a result of the analysis of the user question, the first question extender 520 generates template corresponding entity and attribute as a question template. For example, for a question "which of Overwatch heroes mainly operates in London?", when 'Overwatch hero' is analyzed as an entity and no attribute is detected, a question template may be generated by using all attributes corresponding to the entity 'Overwatch hero' in a knowledge DB.

Next, the first question extender 520 may generate a question template from the knowledge DB 400 based on a result of the analysis of the user question. In detail, the first question extender 520 searches for a group of candidates for an entity and an attribute for each category matching the user question and generates a question template based on synonyms of the entity and the attribute. At this time, the question template may include an instant answer as additional information as well as the entity and the attribute. Therefore, an instant answer may be provided to the user when the user question matches the question template generated by the first question extender 520 as describe below (operation S65). When there is an instant answer, the question template may be generated as training data for training a second question extension operation described below (operation S68).

Next, the first question extender 520 compares the generated question template with the user question and determines whether the generated question template and the user question match (operation S73). When it is determined that the question template and the user question generated by the first question extender 520 are the same, the instant answer already included in the question template is provided as an answer (operation S65). The first question extender 520 may compare the user question with a question template that is generated by removing meaningless characters or words from the user question. For example, in case of a question 'What is the altitude of Mt. Geumgang??', characters irrelevant to the meaning of the question, that is, 'of', and 'the' may be removed via a natural language processing. It is determined whether the user question provided with meaningless characters or words is consistent with the generated question template. If it is determined that the generated question template is not consistent with the user question, the second question extender 530 may be used to extend the user question.

Next, the second question extender 530 generates a similar question template when the generated question template is inconsistent with the user question. In detail, the second question extender 530 performs a secondary extension of the question template by generating a semantic similar question template using a natural language processing and a deep learning model (operation S66) and compares a result of the secondary extension with the user question. In other words, when all question templates generated by the first question extender 520 are inconsistent with the user question, a question extension may be performed based on previously generated question templates by using the second question extender and similar question templates may be additionally generated (operation S74).

Alternatively, when it is determined in operation S72 that no entity and no attribute may be recognized as a result of the analysis of the user question, the first question extender 520 extends the user question by using an existing result of analysis of the user question as a similar question template and compares a result of the extension of the user question with the similar question. In other words, an answer is checked by comparing similar question templates generated based on the user question and the previously generated question template to one another by using the second question extender 530 (similar question engine) In other words, when both an entity and a attribute are not found during the analysis of the user question, a paraphrasing engine of the second question extender may determine the similarity between the user question and previously given answers in a system log and perform a search. The operation corresponds to operations S63 and S78.

The second question extender 530 generates a similar question template by using a semantic similar question generation scheme using a natural language processing and a deep learning model, thereby extending a semantic similar question template and compare a result thereof with the user question. As shown in FIG. 3, the second question extender 530 may include the natural language expanding module 531 and the paraphrasing engine 532. In other words, the second question extender 530 performs a descriptive word extension through the natural language expanding module 531 and determines the similarity between the user question and the question template through the deep learning-based paraphrasing engine 532, thereby providing an answer conforming to a user's intention.

First, the natural language expanding module 531 of the second question extender 530 may provide various patterns for questions of a particular subject by using a natural language processing and generate similar question templates. In one embodiment, a question 'Where is the birthplace of [Person]?' has the same meaning with questions including 'Where was [Person] born?' and 'Where is the place where [Person] born?'". In the second question extender 530, similar question templates may be generated by extending a question template including an entity-attribute combination through a natural language processing, as described above.

In detail, the natural language processing scheme of the natural language expanding module 531 may be implemented to extend a natural language in patterns according to particular attributes by using a similar question DB that is separately established. For example, in case of the attribute 'birthplace', the second question extender 530 may generate similar question templates by extending a question template through various descriptive extensions like 'where is~born?', 'place of birth?', and 'where is the place~is born?'.

Also, the paraphrasing engine 532 of the second question extender 530 generates a semantic similar question template of the user question through paraphrasing. In addition, the paraphrasing engine 532 compares the user question with the similar question template and check a result thereof (operation S75). In detail, the second question extender 530 combines the existing generated question template with the extended similar question template and determines the similarity between the user question and the question template and the similar question template by using a deep learning based paraphrasing engine. The similarity is performed in two stages in total, and details thereof are as follows.

First, the paraphrasing engine 532 measures the similarity among a user question template and existing question templates and similar question templates generated by the first question extender 520 and select top N candidates from the total numbers of the question templates and the similar question templates. At this time, the number of the top N candidates may be changed according to an administrator page or statistics-based feedback program. The paraphrasing engine 532 compares the user question with top N existing question templates and similar question templates and returns one question template considered as the most similar question template and the similarity thereof.

As the second stage, the paraphrasing engine 532 determines whether the top question template selected based on the similarity has the ultimately same meaning as the user question. Determination criteria are initially selected by an administrator may select initially, but may later be adjusted based on statistics through feedbacks of actual results. For example, even when the initial similarity is set to 90%, when an actual correct answer history shows that correct answers have been given with similarities equal to or above 85%, the similarity may be automatically adjusted from 90% to 85%, thereby expanding the answer coverage. When the similarity is less than a certain standard value, a message indicating that there is no search result may be output.

On the other hand, when the above-stated operation is completed, the second question extender 530 may store the top one question template including the user question, top N question templates, and system information including a search time, an operation, and a search speed in a separate DB.

Next, the question answering unit 550 transmits a user question result obtained through the first question extender 520 and the second question extender 530 to the user terminal 110 (operation S65). The user question result is transmitted an AI-based smart machine and is transferred to an interface according to characteristics thereof. At the same time, detailed information including a 'user question', 'whether the user question is answered', 'time', and 'device' may be stored in a system log and used for future paraphrasing model management. Next, the question answering unit 550 transmits the user question result to a user terminal (operation S67).

Furthermore, the training data builder 540 according to one or more embodiments uses training data for training the second question extender 530 by using the user question result through a neural machine translation (NTM) engine (operation S68). In other words, the second question extender 530 may perform a learning (training?) operation using the training data generated by the training data builder 540. In particular, the paraphrasing engine 532 uses a semantic similar question-using method using a deep-learning model. To this end, the deep-learning model needs to be trained with a plenty of amount of training data. Accordingly, the training data builder 540 may performing training of the paraphrasing engine 532 and generate training data for the training.

In detail, according to one or more embodiments, in the case of the deep learning-based paraphrasing engine 532, a model is generated through training without designating the structure of the model in advance. As a result, intervention of an operator may be minimized and, since a deep and complicate structure may be generated, the accuracy thereof is higher than that of existing methods. However, there is a problem that a large amount of training data, which includes tens of thousands or more pieces of training data, is needed for a performance sufficient to replace human works. Accordingly, according to one or more embodiments, a method by which an AI answering device automatically builds training data is provided.

First, the training data builder 540 generates training data for paraphrasing. In more detail, the training data builder 540 builds training data for training the second question extender 530 with the AI answering method according to one or more embodiments, such that the second question extender 530 becomes capable of forming a semantic similar question template. To this end, the training data builder 540 may include the NMT engine manager 541, the training data manager 542, and the model distributor 543.

According to one or more embodiments, the second question extender 530 may include the NMT engine manager 541 for using a plurality of NMT engines for building training data to continuously maintain the quality of a built paraphrasing engine and may include the training data manager 542 that uses a statistics-based management program to manage the translation quality of NMT engines. Furthermore, the second question extender 530 may include the model distributor 543 that performs a training operation and distributes and applies the paraphrasing model. Building of training data and and quality management thereof including a series of operations may be the technical configuration of one or more embodiments.

Figure 8:
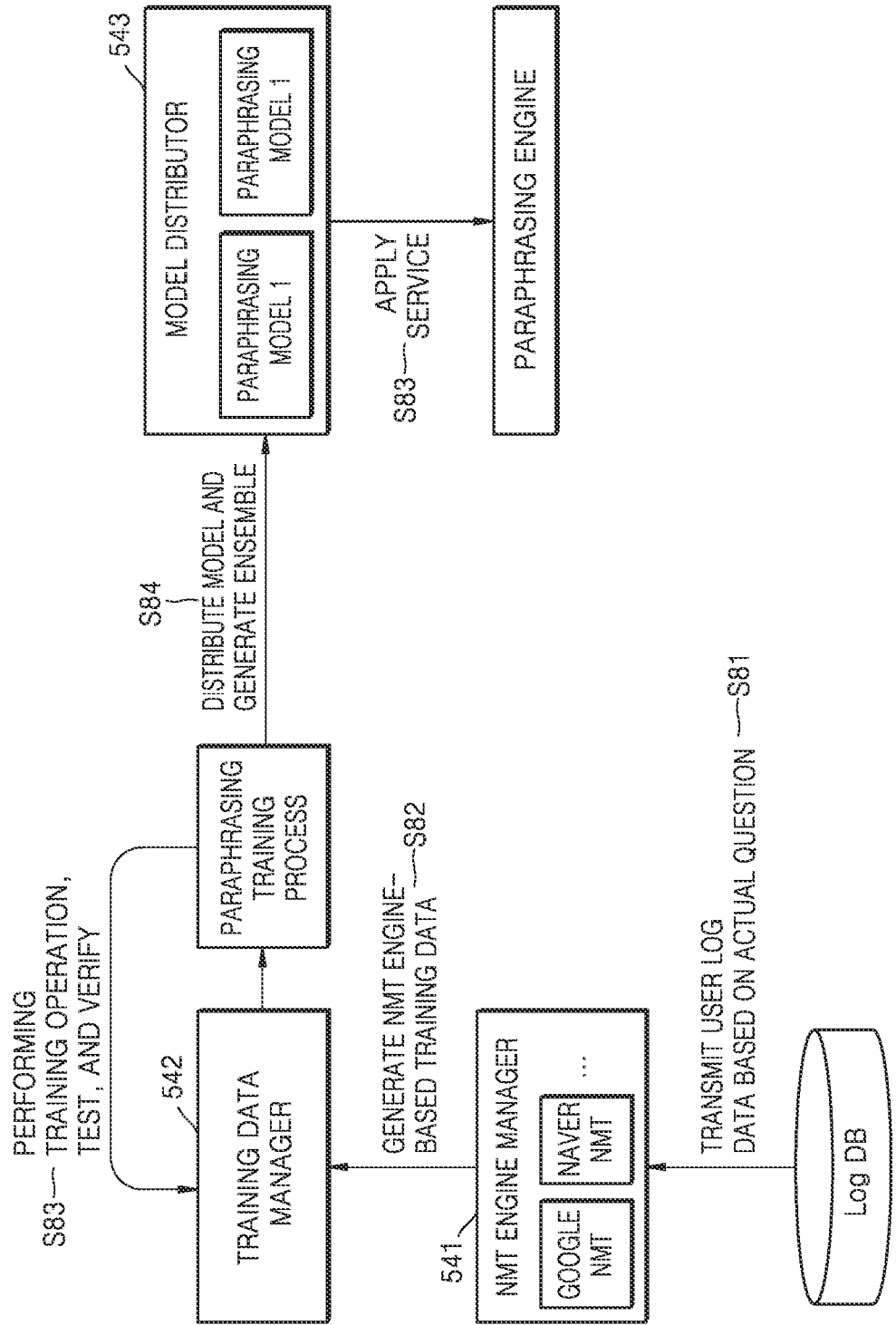
FIG. 8 is a diagram for describing construction of training data and a paraphrasing model according to one or more embodiments.

FIG. 8 is a diagram for describing building of training data and a paraphrasing model according to one or more embodiments.

First, the training data builder 540 sets an actual question of a user as original data and transmits user log data based on the actual question to the NMT engine manager 541 (operation S81). Here, data stored in a log DB of a server may be used as the actual question. The training data builder 540 transmits the log data to the NMT engine manager 541 and prepares generation of training data.

Next, the NMT engine manager 541 generates training data by translating the user log data or a user question into another language by using a plurality of neural network-based external NMT engines and translating a result thereof back to Korean (operation S82). According to an embodiment, the NMT engine manager 541 may translate a first sentence written in Korean into a particular foreign language and may obtain a second sentence by translating the first sentence translated into the particular foreign language back into Korean. In other words, the NMT engine manager 541 may utilize an NMT engine, such that the paraphrasing engine 532 may collect natural language expressions similar to a question or a sentence as training data for the question or the sentence.

Since the NMT engine used in one or more embodiments performs translations using a neural network scheme based on learning rather than based on preset patterns and rules, when the first sentence is translated into a foreign language and translated back into Korean, a natural language sentence that has the same or similar meaning as the first sentence and is differently expressed or the like may be obtained. Furthermore, since external NMT translation engines use different neural network rules and different training data, when translating a same sentence into a particular foreign language and translating back into the Korean, natural language sentences which have similar meanings and are differently expressed may be additionally obtained.

In addition, in case of translating the first sentence in Korean into a first language, translating the first foreign language into a second foreign language, and then translating the second foreign language into Korean, a natural language sentence which has a similar meaning and is differently expressed may be additionally obtained.

Training data formed in the manner as described above is transmitted to the training data manager 542 together with an actual user question and information about external NMTs used, translation stages, and languages used for translation. In detail, since the training data is generated based on the actual user question, the actual user question and the generated training data may be matched in the form of [actual user question—generated training data] and transmitted to the training data manager 542. When the user question is identical to the generated training data, the corresponding information is not transmitted. Furthermore, related information like date and time the training data is generated, an NMT model, and translation languages may also be transmitted to the training data manager 542. On the other hand, translation languages and translation stages may then be automatically adjusted by the training data manager 542 based on an actual paraphrasing engine learning result.

Next, the training data manager 542 may store the training data generated by the NMT engine manager 541, perform learning of an actual paraphrasing model, and test and verify the paraphrasing model. In detail, the training data manager 542 stores training data generated by the NMT engine manager 541, performs learning of a paraphrasing model that may be applied to a paraphrasing engine, and test and verify the paraphrasing model. The paraphrasing learning process shown in FIG. 8 refers to a processor that actually learns a paraphrasing engine and may refer to a function included in the training data builder 540.

Specifically, the training data manager 542 generates a paraphrasing model under various conditions by using the training data generated by the NMT engine manager 541 and trains the paraphrasing model with the training data. The training data manager 542 also manages quality of training data by performing quality evaluation based on a pre-built test set to continuously use NMT models and translation languages with excellent evaluation results and to reduce usage or exclude NMT models and translation languages with poor evaluation results. Furthermore, the NMT engine manager 541 may perform a quality evaluation of a corresponding NMT engine through a verification using a paraphrasing engine, thereby reducing or eliminating the weight of the NMT engine that has generated low quality training data.

More specifically, the training data manager 542 may configure training data as a pair of an actual user question and a question generated by an NMT.

Furthermore, the training data manager 542 classifies training data generated by the NMT engine manager 541 according to certain criteria and secures a certain amount of data for each stage for accurate paraphrasing engine training and quality comparison. For example, based on a same user question, a certain amount of training data obtained by translating the user question in the order of Korean→English→Korean by using the Google NMT engine and a certain amount of training data obtained by translating the user question in the order of Korean→English→Korean by using the Naver NMT engine may be secured, wherein a same amount of training data may be secured for each NMT engine.

Furthermore, the training data manager 542 may train a certain number of or more paraphrasing models for each NMT engine, each translation stage, and each translation language and compare the accuracy of paraphrasing models trained for respective engines and respective languages through a pre-built test set. Here, the test set includes an actual user question and a test question that are not learned by the paraphrasing models. The test questions are input to the paraphrasing models and an evaluation is made based on whether the actual user question is correctly derived.

Also, the training data manager 542 sums results for respective NMT models, respective translations tages, and respective translation language types according to a result given with the test set. Based on the result, engines to be used more frequently and translation schemes to be mainly used for each NMT are automatically fed back to generation of training data. At this time, the training data manager 542 may determine an amount of training data to generate based on a performance evaluation. A mathematical expression representing a performance evaluation is {(evaluation result)−(basic model performance)}/(basic model performance). Based on a result of the mathematical expression, the training data manager 542 adjusts the total amount of training data.

For example, when a result as shown in [Table 1] is obtained, 20% more training data based on Korean→English→Korean through the Google NMT is generated and 20% more training data based on Korean→English→Japanese→Korean through the Naver NMT is generated. Accordingly, training data with better quality may be automatically generated based on a translation language order and quality of each translation engine.

TABLE 1

| | Translation Model | | | |
| --- | --- | --- | --- | --- |
| | Google NMT | Google NMT | Naver NMT | Naver NMT |
| | Translation Language | | | |
| | English | English -> Japanese | English | English -> Japanese |
| Quantity of Training data | 10,000 | 10,000 | 10,000 | 10,000 |
| Basic Model Performance | 50 | 50 | 50 | 50 |
| Evaluation Result | 60 | 50 | 50 | 60 |
| Performance Evaluation | 20% | — | — | 20% |

Next, the model distributor 543 distributes a deep learning-based paraphrasing model trained based on training data, such that the paraphrasing model may be actually used. The model distributor 543 also generates an ensemble of the paraphrasing model (operation S84). The model distributor 543 bundles a plurality of paraphrasing models to improve the performance when performing actual work, such that the plurality of paraphrasing models may be used by a paraphrasing engine in the form of an ensemble.

Finally, the training data builder 540 periodically applies an ensemble-type paraphrasing engine to a service (operation S85), such that the latest high-quality engine may be applied to the service at all times.

The above-described embodiments may be implemented in the form of a computer program that may be executed by various components on a computer, and such a computer program may be recorded on a computer-readable medium. At this time, the medium may continuously store a program executable by a computer or storing it for execution or downloading. In addition, the medium may be one of various recording means or storage means in the form of a combination of a single or a plurality of hardware. The medium is not limited to a medium directly connected to any computer system, but may be distributed over a network. Examples of the medium include a magnetic medium, such as a hard disk, a floppy disk, and a magnetic tape, an optical recording medium, such as a CD-ROM and a DVD, a magneto-optical medium, such as a floptical disk, a ROM, a RAM, a flash memory, .etc., wherein the medium may be configured to store program instructions. As another example of the medium, a recording medium or a storage medium managed by an app store that distributes an application or a website or a server that supplies or distributes various other software.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An artificial intelligence (AI) answering system comprising:
   a user question receiver configured to receive a user question from a user terminal;
   a first question extender configured to generate a question template by analyzing the user question;
   a second question extender configured to generate a similar question template by using a natural language processing and a deep learning model;
   a training data builder configured to generate training data for training the second question extender by using a neural machine translation (NMT) engine; and
   a question answering unit configured to transmit a user question result derived through the first question extender or the second question extender to the user terminal,
   wherein the second question extender is further configured to determine a template having a high degree of similarity to the user question from among the question template and the similar question template, and determine whether the determined template and the user query have the same meaning.

2. The AI answering system of claim 1,
   wherein the question template and the similar question template are semantic triple-based question templates each including an entity, an attribute, and an instant answer.

3. The AI answering system of claim 1,
   wherein the training data builder,
   by using the NMT engine, translates a first sentence in Korean into a particular foreign language, obtains a second sentence by translating the first sentence translated into the particular foreign language back into Korean, and uses the generated second sentence to build training data.

4. The AI answering system of claim 1,
   wherein the second question extender comprises:
   a natural language expanding module configured to natural language-process on the user question; and
   a paraphrasing engine configured to generate a similar question template by paraphrasing the natural language-processed user question.

5. The AI answering system of claim 1,
   wherein, when the user question does not match the generated question template, an instant answer corresponding to the generated question template is provided to the user terminal.

6. An artificial intelligence (AI) answering method comprising:
   receiving a user question from a user terminal;
   a first question extension operation for generating a question template by analyzing the user question;
   a second question extension operation for generating a similar question template by using a natural language processing and a deep learning model;
   a training data building operation for generating training data for training the second question extension operation by using a neural machine translation (NMT) engine; and
   a question answering operation for transmitting a user question result derived through the first question extension operation or the second question extension operation to the user terminal,
   wherein the second question extension operation is further configured to determine a template having a high degree of similarity to the user question from among the question template and the similar question template, and determine whether the determined template and the user query have the same meaning.

7. The AI answering method of claim 6,
   wherein the question template and the similar question template are semantic triple-based question templates each including an entity, an attribute, and an instant answer.

8. The AI answering method of claim 6,
   wherein, in the training data building operation,
   by using the NMT engine, a first sentence in Korean is translated into a particular foreign language, a second sentence is obtained by translating the first sentence translated into the particular foreign language back into Korean, and the generated second sentence is used to build training data.

9. The AI answering method of claim 6,
wherein the second question extension operation comprises:
natural language-processing the user question; and
generating a similar question template by paraphrasing the natural language-processed user question.

10. The AI answering method of claim 6,
wherein, when the user question does not match the generated question template, an instant answer corresponding to the generated question template is provided to the user terminal.

* * * * *